US009433036B2

(12) United States Patent
Kurimoto et al.

(10) Patent No.: US 9,433,036 B2
(45) Date of Patent: Aug. 30, 2016

(54) COOKING DEVICE HAVING PRIORITY MANAGING UNIT FOR FIRST AND SECOND HEATING UNITS

(75) Inventors: Kazunori Kurimoto, Hyogo (JP); Satoshi Tsujimura, Shiga (JP); Naofumi Nakatani, Shiga (JP); Tetsuya Kouda, Osaka (JP); Yasuo Yoshimura, Shiga (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 1074 days.

(21) Appl. No.: 13/379,983

(22) PCT Filed: Jun. 15, 2010

(86) PCT No.: PCT/JP2010/003979

§ 371 (c)(1),
(2), (4) Date: Dec. 21, 2011

(87) PCT Pub. No.: WO2010/150484

PCT Pub. Date: Dec. 29, 2010

(65) Prior Publication Data

US 2012/0097045 A1 Apr. 26, 2012

(30) Foreign Application Priority Data

Jun. 22, 2009 (JP) ................................ 2009-147427

(51) Int. Cl.

*A47J 27/00* (2006.01)
*H05B 3/00* (2006.01)

(Continued)

(52) U.S. Cl.

CPC ............... *H05B 6/062* (2013.01); *F24C 7/087* (2013.01); *H02J 3/14* (2013.01); *Y02B 30/762* (2013.01); *Y02B 70/3266* (2013.01); *Y04S 20/224* (2013.01); *Y04S 20/242* (2013.01)

(58) Field of Classification Search

USPC ............ 219/446.1, 480, 482–487, 489, 490, 219/492, 508, 509, 620; 99/325–329 P, 331

See application file for complete search history.

(56) References Cited

U.S. PATENT DOCUMENTS 4,313,052 A 1/1982 Fischer
6,223,992 B1 * 5/2001 Yasui et al. ................ 236/46 R (Continued)

FOREIGN PATENT DOCUMENTS

JP 10-094170 A 4/1998
JP 3229767 B2 11/2001

(Continued)

OTHER PUBLICATIONS

Extended European Search Report for European Application No. 10791808.8, dated Aug. 9, 2012. 7 pages.

(Continued)

*Primary Examiner* — David Angwin
*Assistant Examiner* — Amit K Singh
(74) *Attorney, Agent, or Firm* — Brinks Gilson & Lione

(57) ABSTRACT

A cooking device includes: first and second heating cooking units; a mode setting unit configured to set heating modes of the first and second heating cooking units; a receiving unit; a priority managing unit configured to store priorities which are given to the first heating cooking unit and the second heating cooking unit, respectively; and a power adjusting unit configured to adjust using power of a heating cooking unit to which a lower one of the priorities of the first heating cooking unit and the second heating cooking unit stored in the priority managing unit is given when the receiving unit receives a power adjustment request signal transmitted from a power controlling device. The priorities are different values for each heating mode.

3 Claims, 9 Drawing Sheets

(51) Int. Cl.
*H05B 6/06* (2006.01)
*F24C 7/08* (2006.01)
*H02J 3/14* (2006.01)

(56) References Cited

U.S. PATENT DOCUMENTS

| | | | | |
|---|---|---|---|---|
| 2009/0250454 | A1* | 10/2009 | Egenter | 219/620 |
| 2011/0270456 | A1 | 11/2011 | Kouda et al. | |

FOREIGN PATENT DOCUMENTS

| | | | |
|---|---|---|---|
| JP | 2003-100434 | A | 4/2003 |
| JP | 2003-347026 | A | 12/2003 |
| JP | 2007-227284 | A | 9/2007 |
| JP | 2008-099343 | A | 4/2008 |
| JP | 2008-130399 | A | 6/2008 |
| JP | 2008-311001 | A | 12/2008 |
| JP | 2009-038044 | A | 2/2009 |
| JP | 2010-075015 | A | 4/2010 |
| WO | WO 95/29572 | A1 | 11/1995 |
| WO | WO 2008/067999 | A1 | 6/2008 |
| WO | WO 2010/079747 | A1 | 7/2010 |

OTHER PUBLICATIONS

International Search Report for International Application No. PCT/JP2010/003979, dated Sep. 21, 2010, 1 page.

* cited by examiner

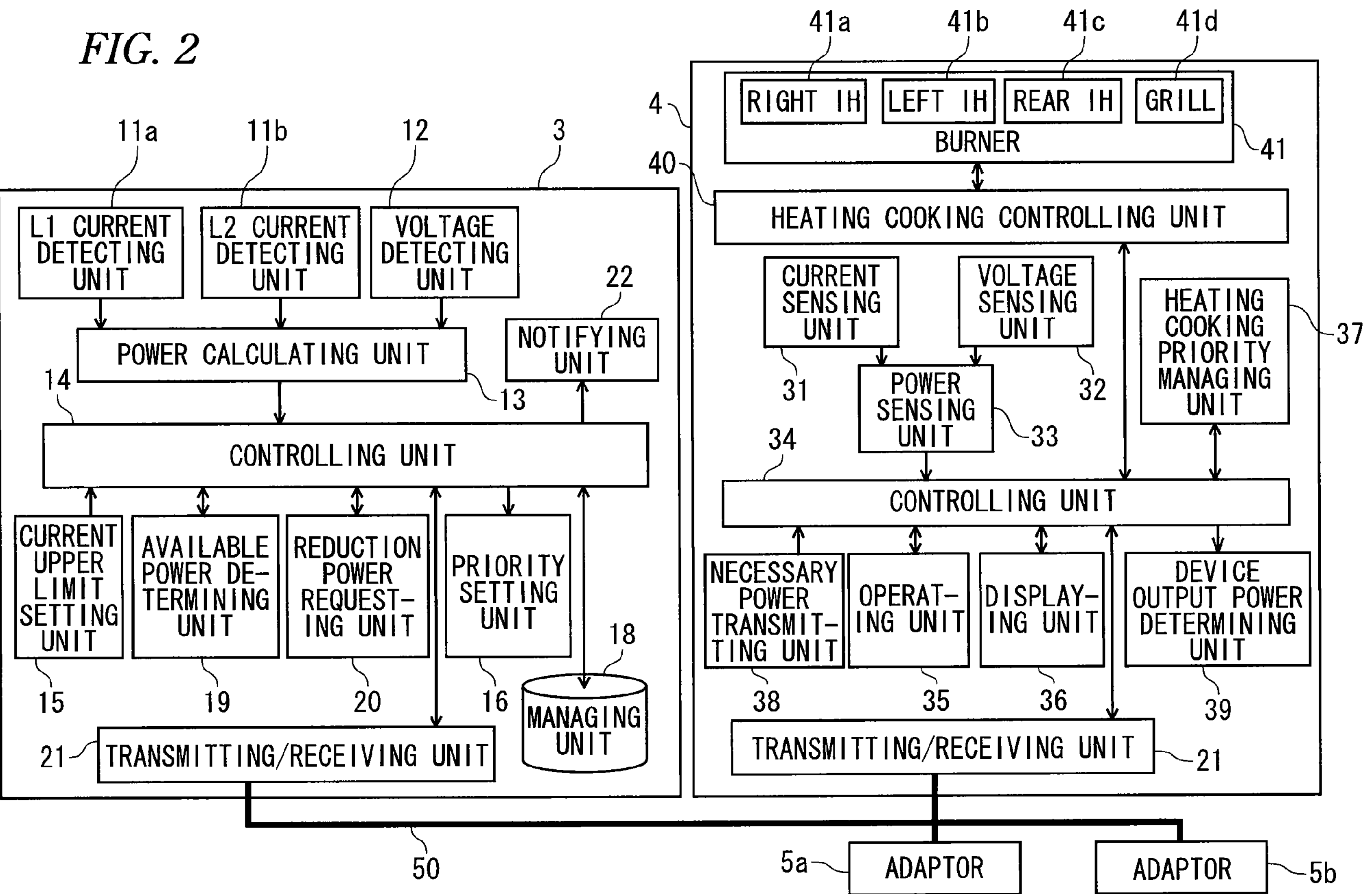
FIG. 2
L1 CURRENT DETECTING UNIT
L2 CURRENT DETECTING UNIT
VOLTAGE DETECTING UNIT
POWER CALCULATING UNIT
NOTIFYING UNIT
CONTROLLING UNIT
CURRENT UPPER LIMIT SETTING UNIT
AVAILABLE POWER DETERMINING UNIT
REDUCTION POWER REQUESTING UNIT
PRIORITY SETTING UNIT
MANAGING UNIT
TRANSMITTING/RECEIVING UNIT
RIGHT IH
LEFT IH
REAR IH
GRILL
BURNER
HEATING COOKING CONTROLLING UNIT
CURRENT SENSING UNIT
VOLTAGE SENSING UNIT
POWER SENSING UNIT
HEATING COOKING PRIORITY MANAGING UNIT
CONTROLLING UNIT
NECESSARY POWER TRANSMITTING UNIT
OPERATING UNIT
DISPLAYING UNIT
DEVICE OUTPUT POWER DETERMINING UNIT
TRANSMITTING/RECEIVING UNIT
ADAPTOR
ADAPTOR
3
4
5a
5b
11a
11b
12
13
14
15
16
18
19
20
21
22
31
32
33
34
35
36
37
38
39
40
41
41a
41b
41c
41d
50

*FIG. 5*

| No. | CLASSIFICATION | LEFT IH | | | | RIGHT IH | | | | REAR IH | | | | GRILL | | | |
|---|---|---|---|---|---|---|---|---|---|---|---|---|---|---|---|---|---|
| | | HEATING MODE | POWER | PRIORITY A | PRIORITY B | HEATING MODE | POWER | PRIORITY A | PRIORITY B | HEATING MODE | POWER | PRIORITY A | PRIORITY B | HEATING MODE | POWER | PRIORITY A | PRIORITY B |
| 0 | MANUAL SYSTEM | OFF | 0 | 0 | 9 | OFF | 0 | 0 | 8 | OFF | 0 | 0 | 7 | OFF | 0 | 0 | 6 |
| 1 | | L1 | 300 | 4 | 9 | L1 | 300 | 3 | 8 | L1 | 300 | 2 | 7 | ON | 1900 | 1 | 6 |
| 2 | | L2 | 400 | 4 | 9 | L2 | 400 | 3 | 8 | L2 | 400 | 2 | 7 | — | — | — | — |
| 3 | | L3 | 500 | 4 | 9 | L3 | 500 | 3 | 8 | L3 | 500 | 2 | 7 | — | — | — | — |
| 4 | | L4 | 700 | 4 | 9 | L4 | 700 | 3 | 8 | L4 | 700 | 2 | 7 | — | — | — | — |
| 5 | | L5 | 900 | 4 | 9 | L5 | 900 | 3 | 8 | L5 | 900 | 2 | 7 | — | — | — | — |
| 6 | | L6 | 1100 | 4 | 9 | L6 | 1100 | 3 | 8 | L6 | 1100 | 2 | 7 | — | — | — | — |
| 7 | | L7 | 1600 | 4 | 9 | L7 | 1600 | 3 | 8 | — | 1600 | 2 | 7 | — | — | — | — |
| 8 | | L8 | 2100 | 4 | 9 | L8 | 2100 | 3 | 8 | — | 2100 | 2 | 7 | — | — | — | — |
| 9 | | L9 | 2500 | 4 | 9 | L9 | 2500 | 3 | 8 | — | 2500 | 2 | 7 | — | — | — | — |
| 10 | | L10 | 3000 | 4 | 9 | L10 | 3000 | 3 | 8 | — | 3000 | 2 | 7 | — | — | — | — |
| 11 | AUTOMATIC COOKING SYSTEM | FRYING | 2000 | 6 | 5 | FRYING | 2000 | 5 | 8 | — | — | — | — | FISH BAKING | 1900 | 7 | 3 |
| 12 | | RICE COOKING | 1000 | 9 | 2 | RICE COOKING | 1000 | 8 | 1 | — | — | — | — | GRATIN | 1900 | 7 | 3 |

FIG. 8

| STATE | LEFT IH | | | | RIGHT IH | | | | REAR IH | | | | GRILL | | | |
|---|---|---|---|---|---|---|---|---|---|---|---|---|---|---|---|---|
| | HEATING MODE | POWER | PRIORITY A | PRIORITY B | HEATING MODE | POWER | PRIORITY A | PRIORITY B | HEATING MODE | POWER | PRIORITY A | PRIORITY B | HEATING MODE | POWER | PRIORITY A | PRIORITY B |
| 1) PRECONDITIONS | L5 | 900 | 4 | 9 | RICE COOKING | 1000 | 8 | 1 | L2 | 400 | 2 | 7 | OFF | 0 | 0 | 0 |
| ↓ (REQUEST OF REDUCTION OF 500 W) | | | | | | | | | | | | | | | | |
| 2) AFTER REDUCTION REQUEST | L4 | 700 | 4 | 9 | RICE COOKING | 1000 | 8 | 1 | OFF | 0 | 2 | 7 | OFF | 0 | 0 | 0 |

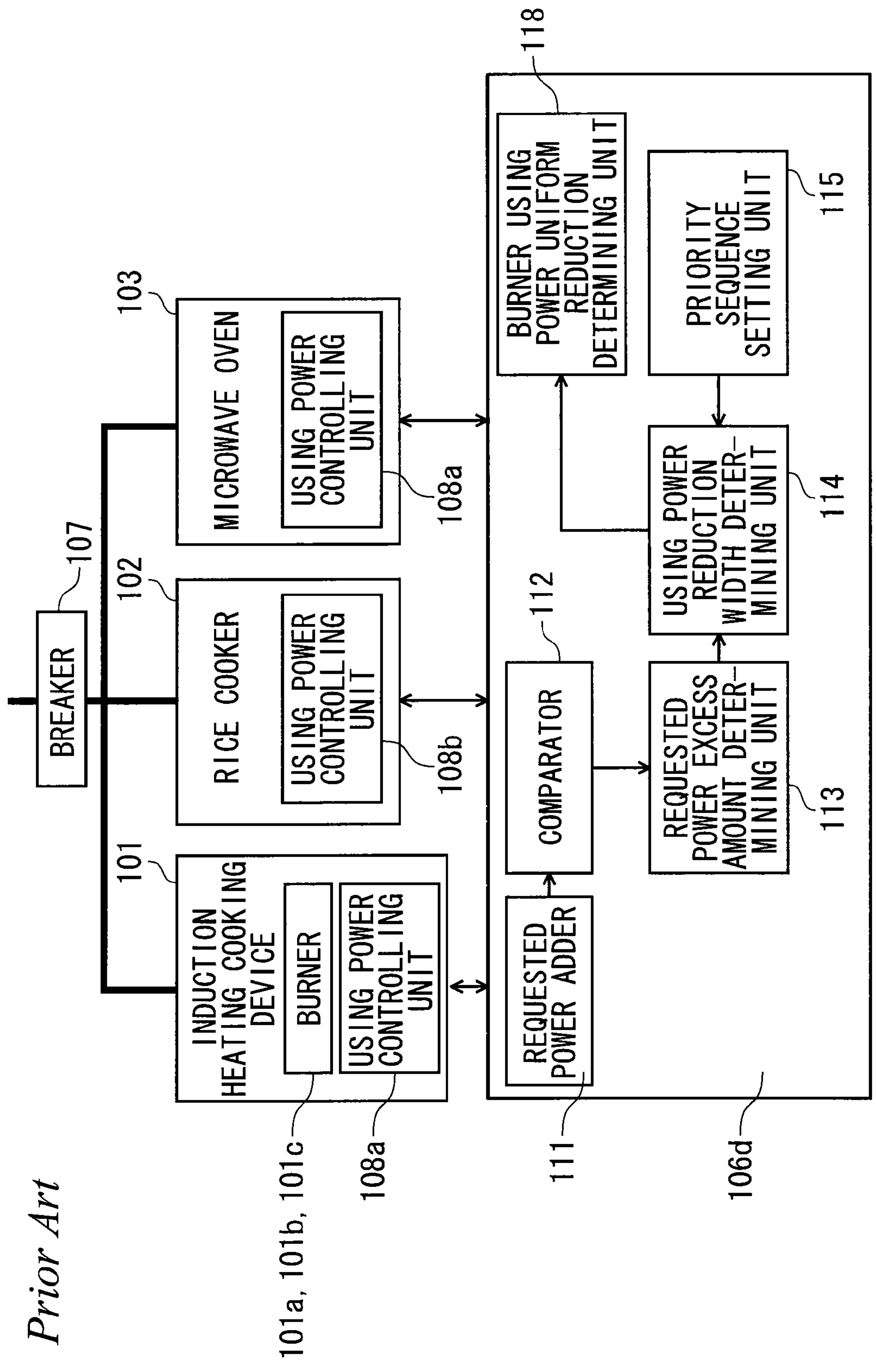
FIG. 9
Prior Art
BREAKER
107
101
INDUCTION HEATING COOKING DEVICE
BURNER
USING POWER CONTROLLING UNIT
101a, 101b, 101c
108a
102
RICE COOKER
USING POWER CONTROLLING UNIT
108b
103
MICROWAVE OVEN
USING POWER CONTROLLING UNIT
108a
REQUESTED POWER ADDER
111
COMPARATOR
112
REQUESTED POWER EXCESS AMOUNT DETER-MINING UNIT
113
USING POWER REDUCTION WIDTH DETER-MINING UNIT
114
PRIORITY SEQUENCE SETTING UNIT
115
BURNER USING POWER UNIFORM REDUCTION DETERMINING UNIT
118
106d

COOKING DEVICE HAVING PRIORITY MANAGING UNIT FOR FIRST AND SECOND HEATING UNITS

This application is a 371 application of PCT/JP2010/003979 having an international filing date of Jun. 15, 2010, which claims priority to JP2009-147427 filed Jun. 22, 2009, the entire contents of which are incorporated herein by reference.

TECHNICAL FIELD

The present invention relates to a cooking device, and a method and program for controlling a cooking device in a power control system for controlling devices so as to prevent a current limiter of a power trunk line in a house from operating thereby interrupting the power supply of the device in use.

BACKGROUND ART

In related art, a electric power control system of this kind determines a reduction width of electric power used by each of a plurality of kitchen electric devices in accordance with a predetermined priority sequence such that total power demanded from using power control means of the kitchen electric devices does not exceed the capacity of a breaker, thereby controlling the using power so as not to exceed the breaker capacity. In the case where the kitchen electric devices are induction heating cooking devices, the electric power control system supplies or stops using power of burners, or uniformly reduces the using power of the burners (for example, see Patent Document 1).

FIG. 9 is a diagram of the related-art electric power control system disclosed in Patent Document 1. In FIG. 9, burner using power uniform reduction detecting means 118 is disposed in a power instructing device 106*d*. When an excess amount of the total power is input from requested power excess amount determining means 103 to using power reduction width determining means 114 of the power instructing device 106*d*, the burner using power uniform reduction instructing means 118 instructs using power controlling means 108*a* of an induction heating cooking device 101 which is one of the plurality of kitchen electric devices and which has a plurality of burners 101*a*, 101*b*, 101*c*, so as to uniformly reduce the using powers of the all burners 101*a*, 101*b*, 101*c*. Therefore, even when reduction is performed so that all of the powers of the burners 101*a*, 101*b*, 101*c* are 2,000 W, the output power equivalent to a gas cooking device is obtained, and the workability of the user is not lowered.

Alternatively, burner number reduction determining means may be disposed in place of the burner using power uniform reduction instructing means 118. When it is necessary to reduce the using power, even when one burner is stopped by giving instructions for stopping or reducing the supply of the using power to one burner, the workability of the user is not lowered.

Patent Document 1: JP-A-2008-99343

SUMMARY OF THE INVENTION

Problem to be Solved by the Invention

However, according to the related-art electric power control system, in the case where a plurality of burners are used in the heating cooker, as a method of reducing the power of the cooking device so as to prevent the breaker from tripping, it is not clarified whether all the burners are reduced at a uniform rate by a given amount or burners to be reduced are selected in what priority.

An object of the invention is to provide a cooking device in which a priority managing unit is provided to the cooking device, and a priority is given in detail to each burner, heating mode, or the like, whereby the electric power is reduced and tripping of a breaker is prevented, without lowering the user usability and while considering easy understanding of the user, and a method and program for controlling a cooking device.

Means for Solving the Problem

In order to solve the above-described problem in the related art, there is provided a cooking device including: first heating cooking means and second heating cooking means for heating a cooking object; mode setting means for setting heating modes of the first heating cooking means and the second heating cooking means; receiving means for receiving a power adjustment request signal transmitted from a power controlling device; priority managing means for storing priorities which are given correspondingly to the first heating cooking means and the second heating cooking means, respectively, in order to determine one of the first heating cooking means and the second heating cooking means as a power adjustment object after the receiving means receives the power adjustment request signal; and power adjusting means, when the receiving means receives the power adjustment request signal, for adjusting a using power of the heating cooking means to which a lower one of the priorities of the first heating cooking means and the second heating cooking means stored in the priority managing means is given, wherein the priorities stored in the priority managing means and given to the first heating cooking means and the second heating cooking means are values which are different for each heating mode which can be set in the mode setting means. In the cooking device, when the power adjustment request signal is received, the output power is controlled according to a priority for each of the heating cooking means and for each of the heating modes, whereby the electric power can be adjusted and tripping of a breaker can be prevented, without lowering the user usability and while considering easy understanding of the user.

Advantages of the Invention

According to the cooking device and method and program for controlling a cooking device of the invention, when receiving the power adjustment request signal, the cooking device controls the output power for each of the heating cooking means and the heating modes, thereby enabling the user to know the heating cooking means and heating mode in which the priority is higher. In the case where cooking is performed while using a plurality of modes, the user uses a burner and heating mode having a higher priority for more important cooking, so that the user usability is not lowered, and even when the margin of electric power in a house is small, cooking can be smoothly continued.

The power controlling device is not required to consider the setting state such as the operation mode of the device side, and the consumed power state. Therefore, the power controlling device simply transmits a necessary reduction power to the device, and the device is required to perform only power suppression in accordance with the received reduction power request. Therefore, a complicated information processing function is not necessary, and hence a system can be economically constructed.

BRIEF DESCRIPTION OF THE DRAWINGS

FIG. 2 is a block diagram of a power controlling device and cooking device of the electric power control system.

FIG. 5 is a view showing a data table which is managed by a heating cooking priority managing unit.

FIG. 8 is a view showing an exemplified pattern which is used in description of power reduction and cancellation of power suppression in the cooking device.

FIG. 9 is a block diagram of a related-art electric power control system.

DETAILED DESCRIPTION OF THE PREFERRED EMBODIMENTS

Figure 1:
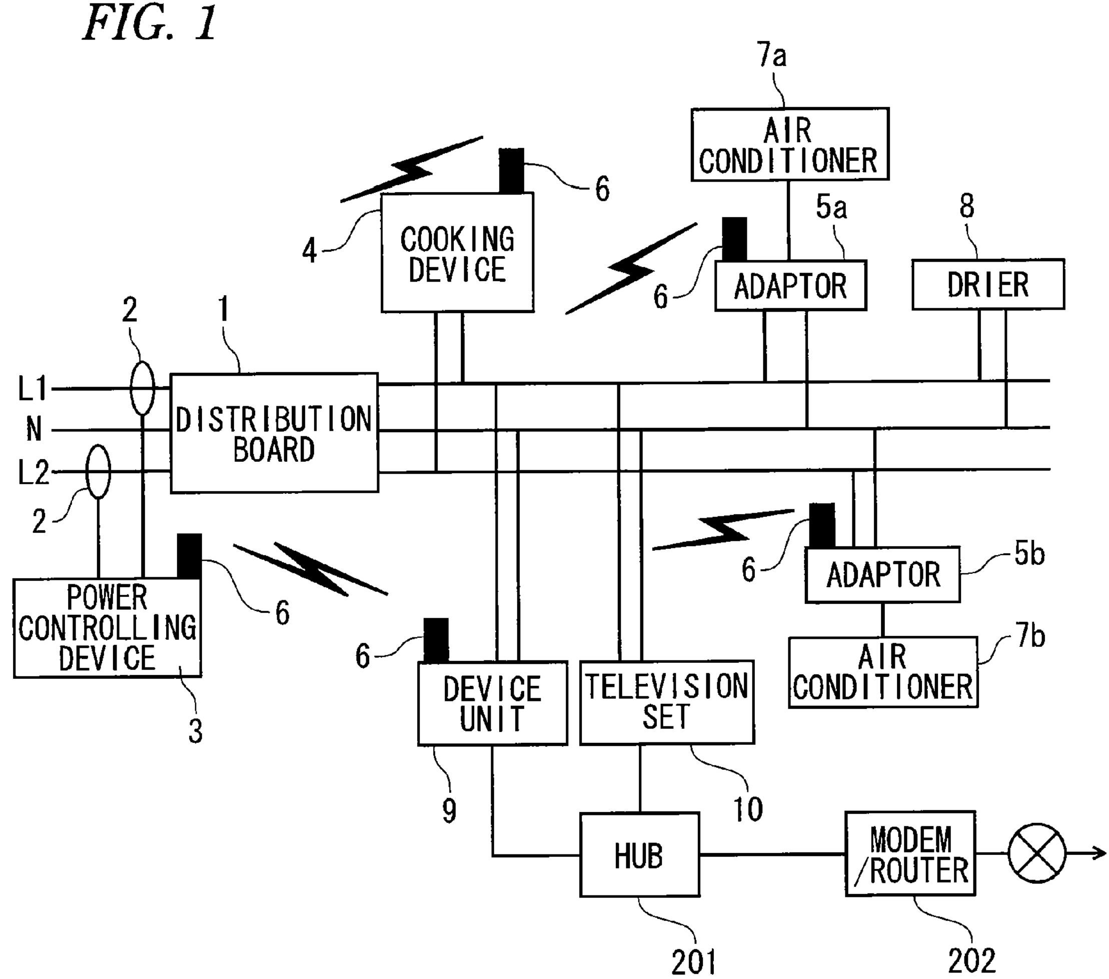
FIG. 1 is a system diagram of an electric power control system including the cooking device of the invention.

A first invention provides a cooking device including: first heating cooking means and second heating cooking means for heating a cooking object; mode setting means for setting heating modes of the first heating cooking means and the second heating cooking means; receiving means for receiving a power adjustment request signal transmitted from a power controlling device; priority managing means for storing priorities which are given correspondingly to the first heating cooking means and the second heating cooking means, respectively, in order to determine one of the first heating cooking means and the second heating cooking means as a power adjustment object after the receiving means receives the power adjustment request signal; and power adjusting means for adjusting a using power of the heating cooking means to which a lower one of the priorities of the first heating cooking means and the second heating cooking means stored in the priority managing means is given when the receiving means receives the power adjustment request signal, wherein the priorities stored in the priority managing means and given to the first heating cooking means and the second heating cooking means are values which are different for each heating mode which can be set in the mode setting means. In the cooking device, when the power adjustment request signal is received, the output power is controlled according to a priority for each of the heating cooking means and for each of the heating modes, whereby the electric power can be adjusted and tripping of a breaker can be prevented, without lowering the user usability and while considering easy understanding of the user.

The electric power is adjusted in accordance with the priorities. Therefore, when the user knows the priorities, in the case where cooking is performed by using the plurality of heating cooking means and heating modes, heating cooking means and a heating mode having a higher priority are used in more important cooking, so that it is possible to avoid a situation where the cooking can not be completed due to a prolonged period of time for cooking or where the result of the cooking is impaired due to a heating failure. Therefore, the user usability is not lowered, and, even when the margin of electric power in a house is small, cooking can be smoothly continued. Further, the power controlling device is not required to consider the setting state such as the operation mode of the device side or the consumed power state. Therefore, the power controlling device simply transmits the power adjustment request signal to the device, and the device is required only to adjust the output power in accordance with the contents of the received power adjustment request, without performing a complicated control process. Therefore, a complicated information processing function is not necessary, and hence a system can be economically constructed.

A second invention provides a cooking device including: first heating cooking means and second heating cooking means for heating a cooking object; mode setting means for setting heating modes of the first heating cooking means and the second heating cooking means; power calculating means for calculating using power amounts of the first heating cooking means and the second heating cooking means; receiving means for receiving a power reduction request signal that requests a reduction of using power so as to be lower than the using power amounts calculated by the power calculating means, or a power reduction cancellation signal that requests an increase of the using power so as to be higher than the using power amounts calculated by the power calculating means, from a power controlling device which is externally disposed; priority managing means for storing: reduction priorities given correspondingly to the first heating cooking means and the second heating cooking means, respectively, in order to determine one of the first heating cooking means and the second heating cooking means as a power adjustment object after the receiving means receives the power reduction request signal; and cancellation priorities given correspondingly to the first heating cooking means and the second heating cooking means, respectively, in order to determine one of the first heating cooking means and the second heating cooking means as a power adjustment object after the receiving means receives the power reduction cancellation signal; and power adjustment amount determining means for determining a using power reduction amount of heating cooking means to which a lower one of the reduction priorities of the first heating cooking means and the second heating cooking means stored in the priority managing means is given when the receiving means receives the power reduction request signal, and for determining a using power adjustment amount of heating cooking means to which a higher one of the cancellation priorities of the first heating cooking means and the second heating cooking means stored in the priority managing means when the receiving means receives the power reduction cancellation signal, wherein the reduction priorities and cancellation priorities stored in the priority managing means and given to the first heating cooking means and the second heating cooking means are values which are different for each heating mode which can be set in the mode setting means. In the cooking device, when the power adjustment request signal is received, the output power is controlled for each of the heating cooking means and for each of the heating modes, whereby the electric power can be adjusted and tripping of a breaker can be prevented, without lowering the user usability and while considering easy understanding of the user.

The electric power is adjusted in accordance with the priorities. Therefore, when the user knows the priorities, in the case where cooking is performed by using the plurality of heating cooking means and heating modes, heating cooking means and a heating mode having a higher priority are used in more important cooking, so that it is possible to avoid a situation where the cooking can not be completed due to a prolonged period of time for cooking or where the result of the cooking is impaired due to a heating failure. Therefore, the user usability is not lowered, and, even when the margin of electric power in a house is small, cooking can be smoothly continued. The power reduction cancellation signal is received from the power controlling device when a margin of electric power in the house is obtained after the electric power is adjusted, and the cancellation priority is set for each of the heating cooking means and the heating modes, whereby the usability can be further improved. Further, the power controlling device is not required to consider the setting state such as the operation mode of the device side or the consumed power state. Therefore, the power controlling device simply transmits the power adjustment request signal or the power reduction cancellation signal to the device, and the device is required only to adjust the output power in accordance with the contents of the received power reduction request signal or power reduction cancellation signal, without performing a complicated control process. Therefore, a complicated information processing function is not necessary, and hence a system can be economically constructed.

A third invention provides the cooking device of the second invention, wherein the heating mode which can be set in the mode setting means includes: a manual system mode in which a heating temperature level is not changed during heating of the cooking object by the first heating cooking means or the second heating cooking means; and an automatic cooking system mode in which the heating temperature level is automatically changed during heating of the first heating cooking means or the second heating cooking means, and wherein the reduction priority given to the first heating cooking means or the second heating cooking means and given to the manual system mode has a value lower than the reduction priority given to the automatic cooking system mode. According to the third invention, the priorities are defined in detail, and particularly the priority in the automatic cooking system mode such as rice cooking is set higher, whereby, even when there is little margin of electric power in a house, rice cooking is prevented from stopping so that tasty rice can be cooked.

A fourth invention provides the cooking device of the second invention, wherein the heating mode which can be set in the mode setting means includes: a manual system mode in which a heating temperature level is not changed during heating of the cooking object by the first heating cooking means or the second heating cooking means; and an automatic cooking system mode in which the heating temperature level is automatically changed during heating of the first heating cooking means or the second heating cooking means, and wherein the cancellation priority given to the first heating cooking means or the second heating cooking means and given to the manual system mode has a value higher than the cancellation priority given to the automatic cooking system mode. According to the fourth invention, the cancellation priorities are defined in detail, and the cancellation priority in the manual system mode is set to be higher than that in the automatic cooking system mode, whereby, in the case where even a small electric power is available, such as a case where heating should be started immediately even at a low heating power, the cooking device is enabled to be used, so that the convenience of the user can be prevented from being lowered.

A fifth invention provides the cooking device of the third invention, wherein the power reduction cancellation signal received by the receiving means contains information indicative of a power amount to be cancelled, and wherein the cooking device includes notifying means for generating a notification in a case where the using power reduction amount which is determined by the power adjustment amount determining means when the power reduction cancellation signal is received by the receiving means is larger than 0. According to the fifth invention, by the notifying means, the user can know a situation where a power cancellation enabled state is attained after there is no margin of electric power in a house and the electric power is adjusted. When the output power is automatically restored, boiling-over or bumping may occur depending on the heating state. Therefore, in the fifth invention, automatic restoring of the output power is not conducted. Instead, the user is notified, and the output power is restored by an operation performed by the user oneself, whereby the safety can be ensured.

A sixth invention provides a method for controlling a cooking device, the method including: a step of heating a cooking object by first heating cooking means; a step of heating a cooking object by second heating cooking means; a step of setting heating modes of the first heating cooking means and the second heating cooking means; a step of receiving a power adjustment request signal transmitted from a power controlling device; and a step of adjusting, in a case of receiving the power adjustment request signal, a using power of heating cooking means to which a lower one of priorities given to the first heating cooking means and the second heating cooking means, respectively, in order to determine one of the first heating cooking means and the second heating cooking means as a power adjustment object after the reception, wherein the priorities given to the first heating cooking means and the second heating cooking means, respectively, are values which are different for each of the heating modes. In the method for controlling a cooking device, when the power adjustment request signal is received, the output power is controlled according to a priority for each of the heating cooking means and for each of the set heating modes, whereby the electric power can be adjusted and tripping of a breaker can be prevented, without lowering the user usability and while considering easy understanding of the user.

A sixth invention provides a program for causing a computer to realize at least a part of the functions of the cooking device according to any one of the first to fifth inventions. Since this invention provides a program, at least a part of the cooking device of the invention or an electric power control system including the cooking device can be easily realized by cooperating hardware resources such as an electric/information device, a computer, and a server with one another. Moreover, a work of distributing or installing the program can be easily performed by recording the program on a recording medium, or distributing the program through a communication line.

Hereinafter, an embodiment of the invention will be described with reference to the drawings. The invention shall not be limited to the embodiment.

Embodiment 1

FIG. 1 is a system diagram of an electric power control system including the cooking device of the invention, and FIG. 2 is a block diagram of a power controlling device and cooking device of the electric power control system.

In a first embodiment of the invention, power supply lines of the input side of a distribution board 1 through which 200 V of the single-phase three-wire system is introduced are clamped by current clamps 2, and input currents L1, L2 are measured by the power controlling device 3. Although not illustrated, a breaker which, when a current larger than the rated current flows, interrupts the power supply is disposed in the distribution board 1. As a breaker, there are a type in which, when the current flowing through one of phases L1 and L2 is larger than a predetermined level, an interruption is caused, and that in which, when a sum of the currents flowing through phases L1 and L2 is larger than a predetermined level, an interruption is caused. In the embodiment, description will be made assuming that a breaker of the latter type in which a sum of the currents flowing through phases L1 and L2 is larger than a predetermined level, an interruption is caused is used.

In the output line of the distribution board 1, furthermore, a configuration is employed where a cooking device 4 is connected as an AC 200 V system, and one adaptor 5*a* to which an air conditioner 7*a* is connected, and one drier 8 are connected to the phase L1, and one adaptor 5*b* to which an air conditioner 7*b* is connected is connected to the phase L2. Wireless communication devices 6 are incorporated in the power controlling device 3, the cooking device 4, and the adaptors 5*a*, 5*b*, and information can be transmitted. As a wireless communication method, the specific low power wireless system is used, and communication is performed by using a transmission frequency of 400 MHz band.

A device unit 9 includes a wireless communication device 6, and can intercept wireless communication data which are transmitted in the air in the same system, so that information of the above-mentioned devices such as the cooking device 4, the air conditioner 7*a*, the air conditioner 7*b*, and the drier 8 can be collected. The unit incorporates a function of a Web server as software, do not have displaying means which can display characters, images, and the like, and therefore can be economically constructed.

The device unit 9 and a television set 10 are connected to each other by a universal network through a hub 201. The television set 10 includes a Web browser, and information collected by the device unit 9 can be browsed by means of screen display through the universal network by using a Web browser of a device having a Web client function such as the television set 10 or a personal computer (not shown).

Physically, the universal network is not particularly designated, and may be any network as far as it can perform transmission and reception by means HTTP protocol.

The television set can be connected to the Internet through a modem/router 202.

Although, in an actual house, many other devices are connected, the above configuration will be described in order to simplify the description.

FIG. 2 is a block diagram of the power controlling device 3 and cooking device 4 of the electric power control system. The power controlling device 3 includes: an L1 current detecting unit 11*a* which measures a current flowing through a power supply system line of the phase L1 of the single-phase three-wire 200 V; an L2 current detecting unit 11*b* which measures a current flowing through a power supply system line of the phase L2; and a voltage detecting unit 12 which measures the voltage of the phase L1 or L2, and a power calculating unit 13 calculates the power value based on the current and voltage values which are measured by the L1 current detecting unit 11*a*, the L2 current detecting unit 11*b*, and the voltage detecting unit 12. As the power, the input power value of the phase L1, the input power value of the phase L2, the total input power value of the phases L1 and L2, and the like are calculated.

A controlling unit 14 performs a calculation process on the input information or data, and produces and transmits control signals and data.

A current upper limit setting unit 15 sets an upper limit of the values of the currents flowing in the phases L1 and L2. The upper limit may be set in the following manner. An initial value is previously set, and, in the case where a change is necessary, inputting means such as a switch, or an external terminal is disposed, and setting can be performed through a dedicated terminal device or a personal computer. In the embodiment, the initial value=30 A is used. When the total value of the currents flowing in the phases L1 and L2 exceeds the set upper limit, instructions for reducing the power is issued to a device. After the power is reduced, when the total current value of the phases L1 and L2 is 90% or less of the upper limit, it is determined that there is a margin of electric power, and instructions for suppressing the power reduction is issued to the device in which the power is reduced. The value of the upper limit or 90% is determined while considering a hysteresis so that the power reduction is not frequently performed on a device, and is an example value.

A priority setting unit 16 determines the use priority of a device. For example, the priority is set by a method in which a dip switch is disposed on the side of the device, the user sets the priority, and, when the power supply of the device is turned on or the setting is changed, information of the priority is transmitted to the power controlling device 3, the power controlling device 3 receives the priority information from the device, and the priority setting unit 16 sets and grasps the priority of the device, and updates the priority information of data which are managed by a managing unit 18. Another method may be performed in the following manner. The device unit 9 and the television set 10 are used, a priority setting screen is displayed on the television screen, and the user can freely set the priority of the connected device on the television screen by using a remote controller for the television set.

The managing unit 18 manages as data, set values or states such as the above-described priority information, information of the using power of the device, and the power suppression control state of the device, and stores information other than the information of the using power of the device, in a nonvolatile memory such as an EEPROM, so that data are not erased even when the power supply is interrupted.

An available power determining unit 19 calculates the difference between the current upper limit which is set in the current upper limit setting unit 15, and the current value which is measured by the L1 current detecting unit 11*a* or the input power value, and, in response to an inquiry from the device or to the device in which the power is suppressed, transmits information containing an available power value based on the difference, as an available power notification signal. Namely, in the case where the device receives the available power notification signal, when the power is within the available power value, the device determines that a further power is available. In the case where there is a device in which power suppression is performed, when the current is 90% or less of the upper limit which is set in the current upper limit setting unit 15, particularly, the available power notification signal is transmitted.

When the current value measured by the L1 current detecting unit 11*a* or the L2 current detecting unit 11*b* exceeds the current upper limit which is set by the current upper limit setting unit 15, there is a possibility that the breaker of the distribution board 1 may trip. Therefore, a reduction power requesting unit 20 transmits a reduction power request signal in which the excess amount is set as a reduction power value so as to reduce the using power, to the device side. Upon receiving the reduction power request signal, namely, the device side reduces the using power. A transmitting/receiving unit 21 transmits and receives data through a communication network unit 50 which performs wireless communication.

A notifying unit 22 notifies of an alarm or the like with a sound by using a buzzer, a speaker, or the like. As the cooking device 4, a cooking device is used which includes four burners 41, and which has function of three IH coils 41*a*, 41*b*, 41*c* that are placed in the right, left, and rear sides, respectively, and one grill 41*d*. On the IH coils 41*a*, 41*b*, 41*c*, the user can selectively use functions such as "Heating" of a manual system in which the output level can be stepwisely set, and "Frying" and "Heating cooking" of an automatic cooking system. The grill 41*d* is controlled by a heater, and, in the grill, a cooking mode (heating mode) of an automatic cooking system by a plurality of sequence patterns such as "Fish baking" and "Gratin" can selected. The automatic cooking system is a convenient function in which cooking is automatically performed by the device, such as a cooking mode in which cooking is performed during the time that is determined by a sequence pattern of the relationship of the time and the output power, and that in which the output power is automatically controlled by using a temperature sensor, an infrared sensor, or the like. The manual system is a function in which heating power caused by constant electric power is output in accordance with the selected heating level. The principle of heating and the like in the cooking device 4 is well known, and its description and illustration are omitted.

In the cooking device 4, there are a current sensing unit 31 which measures the current flowing through the power supply system line of one phase of 200 V, and a voltage sensing unit 32 which measures the voltage, and, in a power sensing unit 33, the value of the using power of the cooking device 4 is calculated based on the current and voltage values which are measured by the current sensing unit 31 and the voltage sensing unit 32.

A controlling unit 34 performs a calculation process on the input information and data, and produces or transmits control signals and data.

An operating unit 35 is configured by switches such as buttons for selecting the functions such as "Heating", "Frying", "Heating cooking", and "Boiling" in the IH coils 41*a*, 41*b*, 41*c*, or grill 41*d* of the cooking device 4.

The switches of the operating unit 35 may be electrostatic switches, tact SWs, or touch screens. A displaying unit 36 displays a mode display of the function selected by the operating unit 35, the operation state in the running, and the like, on an LED or a liquid crystal panel.

A heating cooking priority managing unit 37 is a table for converting the heating mode and priority of the IH coils 41*a*, 41*b*, 41*c*, or the grill 41*d*, and necessary power. The table will be described later in detail. FIG. 5 shows an example of the table.

A necessary power transmitting unit 38 refers the table of the heating cooking priority managing unit 37 with respect to the contents of the operation by the user, and inquires the power controlling device 3 of the necessary power.

When receiving a result of the inquiry or the available power notification signal from the power controlling device 3, a device output power determining unit 39 determines, with respect to the available power value contained in the received information, the heating mode of the maximum power within the available power value while using the table of the heating cooking priority managing unit 37, and an output power control power of each burner for the determined heating mode is performed by a heating cooking controlling unit 40 through the controlling unit 34.

When a power reduction request signal is received from the power controlling device 3, the cooking device 4 refers the table of the heating cooking priority managing unit 37, selects a heating mode in which reduction is performed in ascending order of priority, and repeats the search of the table until reduction is performed more than the reduction power value.

Next, the operation of reducing the power of the power control system including the cooking device 4 of the invention will be described with reference to the sequence diagram of FIG. 3, the flowchart of FIG. 4, and the data table of FIG. 5.

Figure 3:
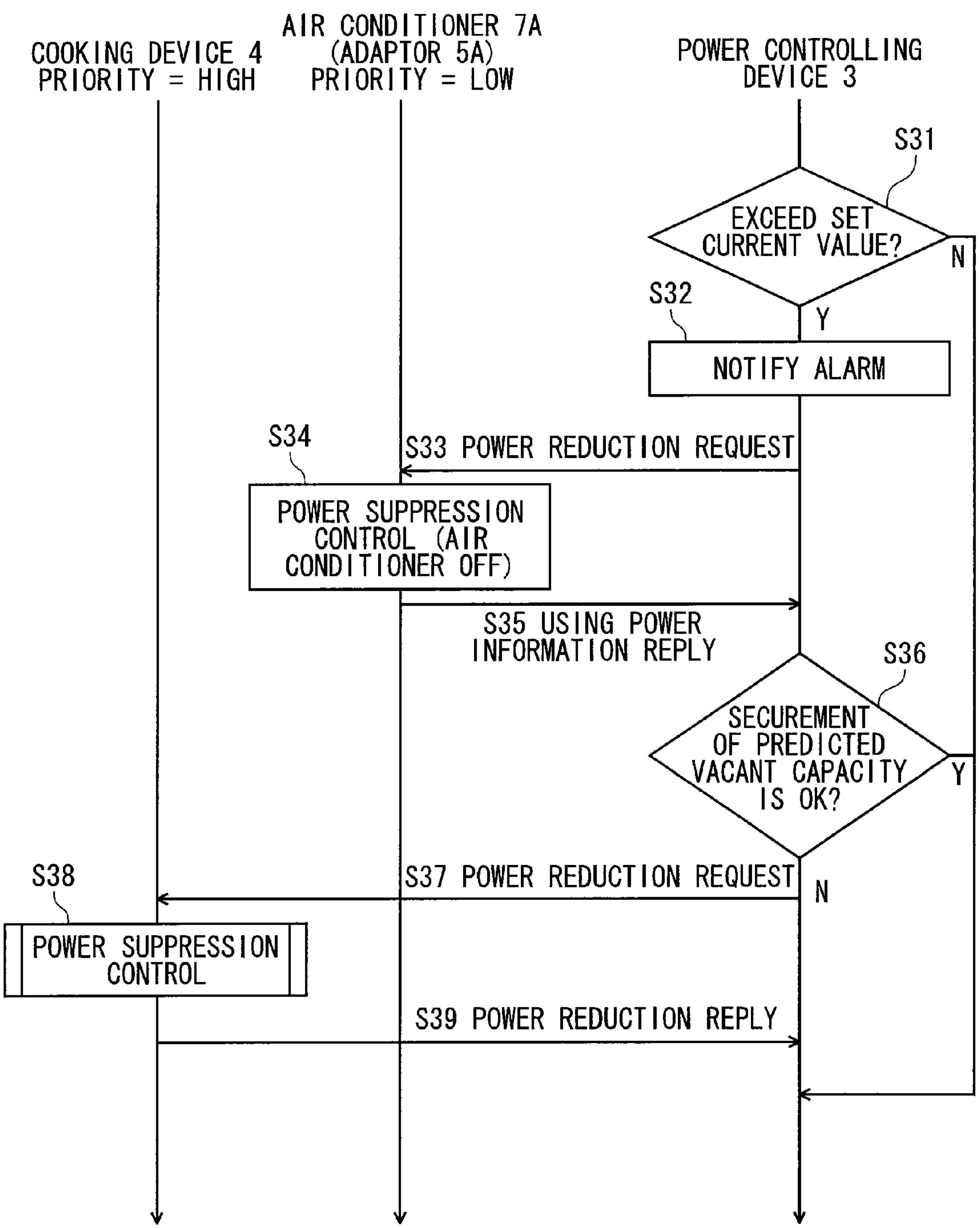
FIG. 3 is a sequence diagram showing an operation of advancing reduction of electric power in the electric power control system.

FIG. 3 is a sequence diagram showing an operation of reducing electric power of each device when power higher than a predetermined value is detected in the power controlling device 3.

Referring to FIG. 3, in the power controlling device 3, when the controlling unit 14 determines that the total value of the currents detected by the L1 current detecting unit 11*a* and the L2 current detecting unit 11*b* exceeds the current value (in the embodiment, 30 A) set in the current upper limit setting unit 15 (S31, Y), it is determined that power is excessively used in the house, the notifying unit 22 notifies an alarm with a sound or a display (S32), the reduction power requesting unit 20 selects devices in ascending order of priority which is set in the priority setting unit 16, and the power reduction request signal is transmitted from the transmitting/receiving unit 21 (S33). Information contained in the power reduction request signal is the power value. In the case where the controlling unit 14 determines that the current exceeds by 5 A the current value set in the current upper limit setting unit 15, for example, a power value conversion is performed, and 500 W (5 A×100 V) is set as the power value which is requested to be reduced. Namely, the current portion which exceeds the threshold set in the current upper limit setting unit 15 is converted to a power value, and then reduction is requested. In order to simplify the description, it is assumed that two devices or the cooking device 4 and the adaptor 5*a* to which the air conditioner 7*a* is connected exist as controllable devices, and that the priority of the cooking device 4 is set to be higher than that of the adaptor 5*a*.

The adaptor 5*a* which receives the power reduction request signal turns OFF the air conditioner 7*a*. The adaptor 5*a* may perform the turning OFF operation by a method in which the air conditioner 7*a* is turned OFF by switching means such as a relay, or a configuration where a remote control light emitting device is disposed and the air conditioner is turned OFF by transmitting a remote control signal. Alternatively, the adaptor 5*a* may not turn OFF the air conditioner 7*a*, and may change the operation mode of the air conditioner 7*a* to an air blow mode, or reduce the number of revolutions of a compressor of the air conditioner 7*a*, thereby reducing the power.

Moreover, the adaptor 5*a* sends the power to be reduced as a reply (S34).

In the power controlling device 3, the transmitting/receiving unit 21 receives the replay from the adaptor 5*a* (S35), and the controlling unit 14 analyzes the received information. In the case where the reduction power value in the reply from the adaptor 5*a* is smaller than the current portion which exceeds the threshold in step S31 (S36, N), it is determined that the value is still insufficient for the necessary reduction power, and therefore the reduction power requesting unit 20 transmits the power reduction request signal of information containing the insufficient power value, from the transmitting/receiving unit 21 to the device of the next priority (here, the cooking device 4) (S37). As a specific example, in the case where, when the power reduction request signal of a reduction request of 800 W is transmitted in step S33, the adaptor 5*a* returns a reduction power reply signal of 500 W as a reducible power in step S35, the power controlling device 3 transmits the difference of 300 W (800 W−500 W) as insufficient power to the cooking device 4 of the next priority.

In the cooking device 4, when the transmitting/receiving unit 21 receives the power reduction request signal, the controlling unit 34 analyzes the received information, and performs the power suppression control (S38), with the result that, as information containing the reduction power value which is determined in the device output power determining unit 39, the power reduction request signal is transmitted as a reply of the reduction power (S39). The operation of the power suppression control (S38) will be described in detail later with reference to FIG. 5.

In the case where the excess is 800 W in the term of a power value in step S31, for example, reduction of 800 W is necessary. In the case where the air conditioner 7*a* connected to the adaptor 5*a* operates at 500 W, 300 W is insufficient even when the air conditioner is stopped. Therefore, a request for reduction of 300 W is given to the cooking device 4.

In the case where the cooking device 4 uses a plurality of burners 41, power reduction is performed in ascending order of priority A in the used burners 41 and the heating modes in the table shown in FIG. 5.

Figure 4:
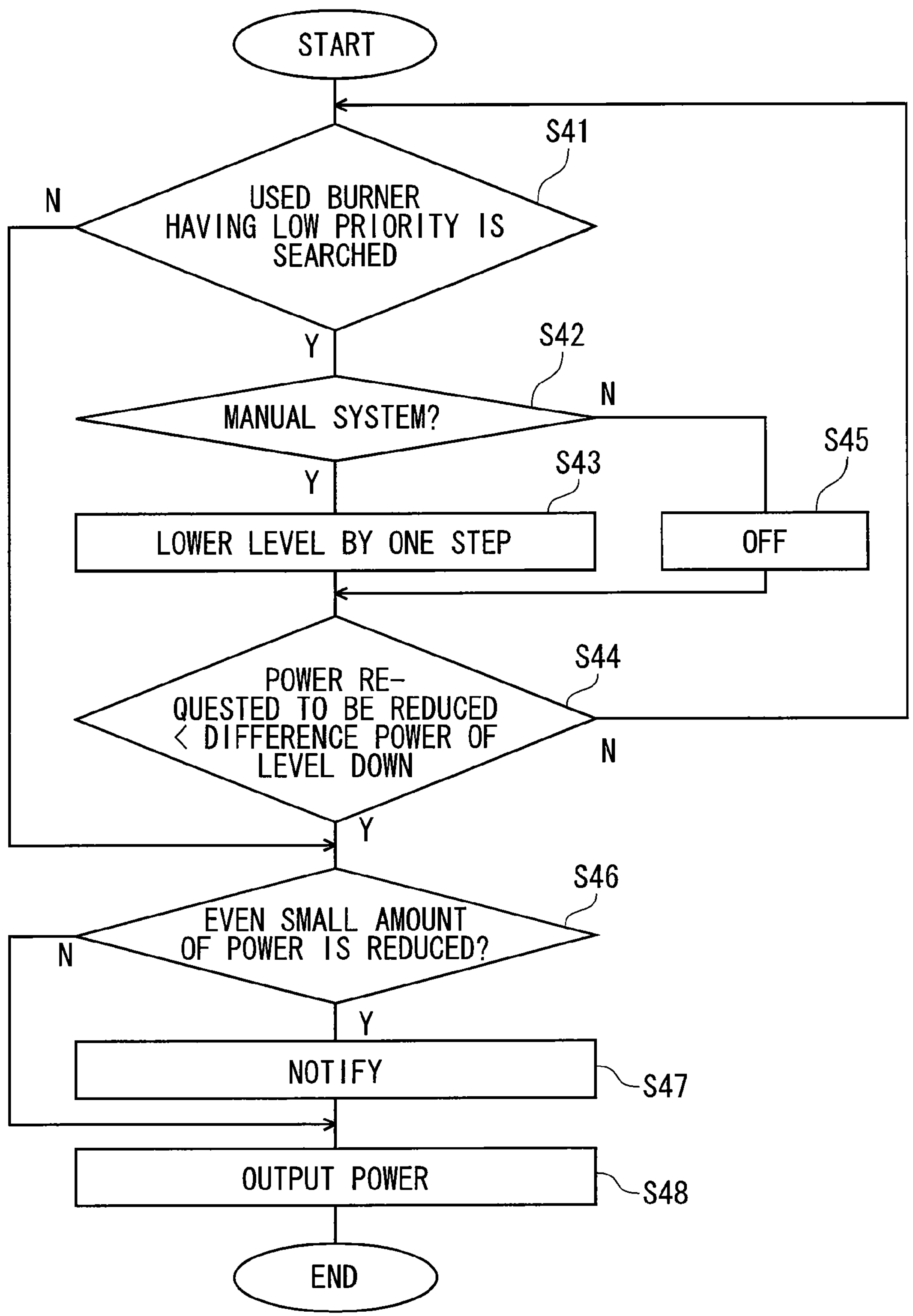
FIG. 4 is a flowchart showing a power reducing process of the cooking device.

The flowchart of FIG. 4 shows the operation of performing power reduction in ascending order of priority A in the cooking device 4. In FIG. 4, the priority which is mostly lower than priority A is searched from the used burners 41 and the heating modes in the table of FIG. 5 (S41).

FIG. 5 shows the data table which is managed by the heating cooking priority managing unit 37.

In the cooking device 4, "Heating mode", "Power", "Priority A", and "Priority B" are disposed for each of the burners 41 (the left IH 41*b*, the right IH 41*a*, the rear IH 41*c*, the grill 41*d*). "Heating mode" means a mode which is selected by the user through an operation panel of the operating unit 35. As the manual system, a desired heating power can be selected in 10 steps of Level 1 to 10 (hereinafter, referred to as L1 to L10) for the left IH 41*b* and the right IH 41*a*, and 6 steps of Level 1 to 6 (hereinafter, referred to as L1 to L6) for the rear IH 41*c*. As the automatic cooking system, frying and rice cooking can be selected for the left IH 41*b* or the right IH 41*a*. In the grill 41*d*, heating can be performed by the heater, and, as the automatic cooking system, menus of fish baking and gratin are prepared.

The item denoted by "Power" indicates the output power of each of the IHs 41*a* to 41*c* and the grill 41*d*. In the automatic cooking system, the output power pattern is changed, and the maximum output power in the sequence of one cooking operation is shown. As the conditions for, after a heating mode in the automatic cooking system is stopped by power reduction, restoring the mode, when the available power notification signal indicative of a value which is equal to or larger than the maximum power value during the sequence is not transmitted from the power controlling device 3, the operation of the automatic cooking is not allowed, thereby preventing the breaker from tripping.

"Priority A" shows the priority of the burner 41 which is an object of power reduction in the case where the power reduction request signal is received from the power controlling device 3. In the case where a plurality of burners 41 are simultaneously used, the burner 41 to be reduced is selected depending on the priority. In a burner in which the value of the priority is larger, the using power amount is maintained, and, in a burner in which the value of the priority is smaller, the power amount is reduced. In the case where the power reduction request signal is transmitted when the left IH 41*b* is used in the heating mode=L5 and the right IH 41*a* is used in the heating mode=L5, for example, the heating output power of the right IH 41*a* is reduced.

"Priority B" shows the priority which can be restored in the case where, when there arises a margin of the main current in the power controlling device 3 after the power reduction is performed, the available power notification signal is sent, and, when the cooking device 4 receives the available power notification signal, the powers of a plurality of burners 41 are reduced.

Returning to the description of FIG. 4, if the determination of the controlling unit 14 is the manual system (S42), the device output power determining unit 39 refers the heating cooking priority managing unit 37 through the controlling unit 34, lowers the level by one step, and calculates the reducible power (S43). If the automatic cooking system, the automatic cooking is stopped (OFF) (S45).

If reduction power which is equal to or larger than the power requested to be reduced is not ensured (S44, N), the process returns to step S41, and similar processes are repeated.

Description will be made by using an example of the state of the burners 41 of the cooking device 4 and the heating mode shown in FIG. 8, as a specific example.

The case will be described where, as shown in FIG. 8, the power reduction request of 500 W is received in the state where the heating mode of the left IH 41*b*=L5 operation, the heating mode of the right IH 41*a*=the rice cooking operation, the heating mode of the rear IH 41*c*=L2 operation, and the heating mode of the grill 41*d*=OFF. Namely, the power reduction of 500 W is necessary. The burner having the lowest priority except the burner 4 which is not used is the priority of the rear IH 41*c*=2. When the rear IH 41*c* is reduced from L2 to OFF, 400 W can be reduced, but the reduction is insufficient. Therefore, the next priority is searched, and the left IH 41*b* is detected. When the heating mode of the left IH 41*b* is reduced from L5 to L4, 200 W can be reduced, and a total of 600 W can be reduced.

Therefore, the heating powers (electric powers) are output in the heating modes which are indicated in 2) of FIG. 8. In this way, the cooking device 4 can be used at ease without causing the breaker to trip. Also the rice cooking in the automatic cooking is not stopped, and hence the usability is very excellent.

Until the reducible power is ensured in this manner, the level of the heating mode is lowered or the automatic cooking is turned OFF in accordance with the priorities. When each burner 41 is lowered to OFF, further reduction in the burner 41 is impossible, and therefore another burner 41 is selected in step S41. In the manual system, similarly, the level of the heating mode is lowered by each step. As described above, the device output power determining unit 39 refers the heating cooking priority managing unit 37 through the controlling unit 34, and determines the set values of the burners 41 until the reducible power is ensured.

In the case where the controlling unit 34 determines and even a small amount of power is reduced (S46), notification is performed by a method such as lighting of an LED lamp in the displaying unit 36 so that the user is notified of the suppression of the heating powers (electric powers) in the selected heating mode (S47), and the heating powers (electric powers) which are determined for the burners 41 by the device output power determining unit 39 are output by the heating cooking controlling unit 40 through the controlling unit 34 (S48). In step S47, of course, the notification may be performed by a sound produced by a buzzer or the like which is not shown.

Of course, although not shown in FIG. 2, when the notification is performed not only by the displaying unit 36, and also by a buzzer, a sound, or the like, the user can easily know the power reduction. When the display is performed so that it is possible to know the heating mode in which each burner 41 is controlled, the user well understands the situation, and the breaker does not trip.

As shown in FIG. 5, in priority A, the sequence control in which the output power is changed is performed in the automatic cooking system, and, when heating cooking is stopped, problems occur in the cooking contents, and hence the priority is set to be higher than that in the manual system. In the case of rice cooking, particularly, the boiled state of rice is largely affected, and therefore the priority is set to a highest level, and the automatic cooking is prevented as far as possible from stopping.

Next, an operation of advancing cancellation of reduction of electric power in the electric power control system including the cooking device 4 of the invention will be described with reference to the sequence diagram of FIG. 6, the flowchart of FIG. 7, and the data table of FIG. 5.

Figure 6:
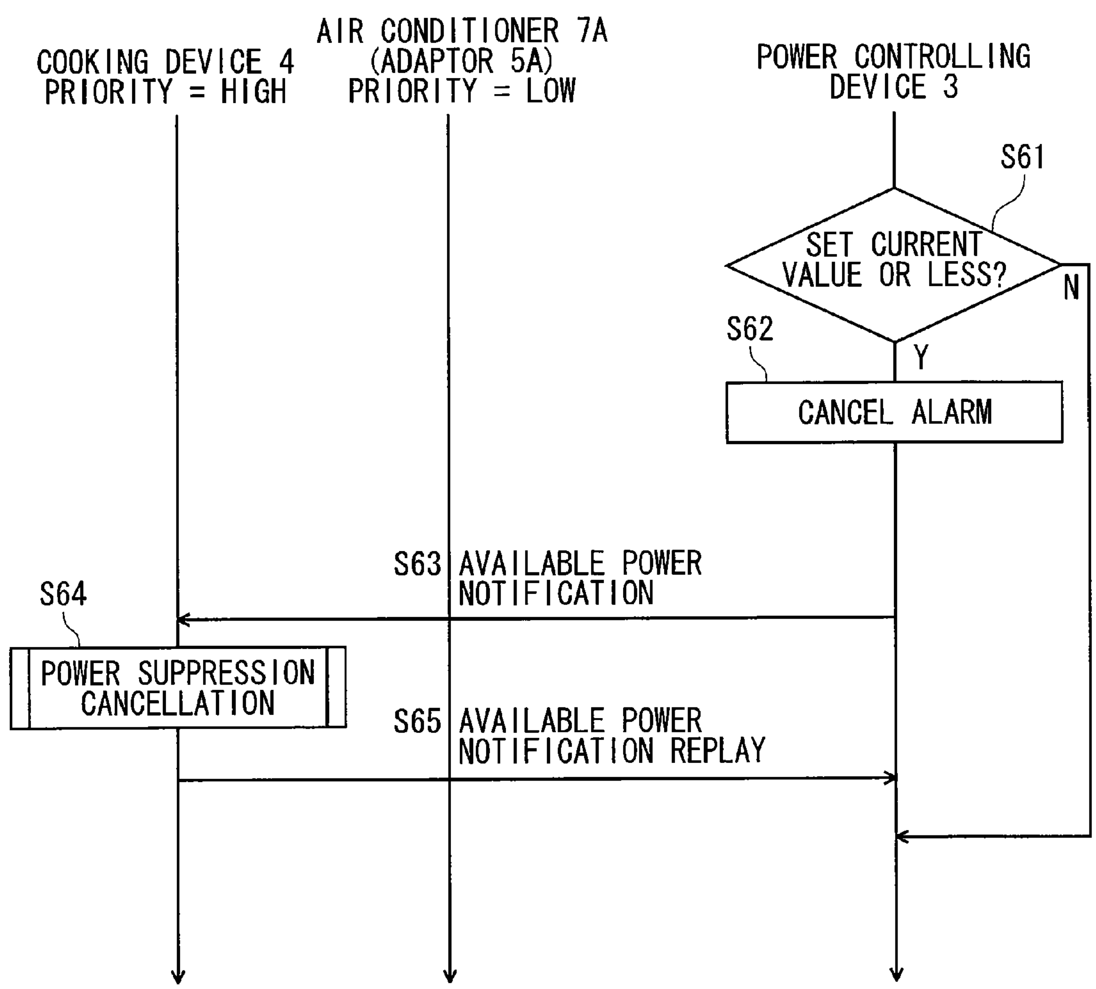
FIG. 6 is a sequence diagram showing an operation of advancing cancellation of reduction of electric power in the electric power control system.
Figure 7:
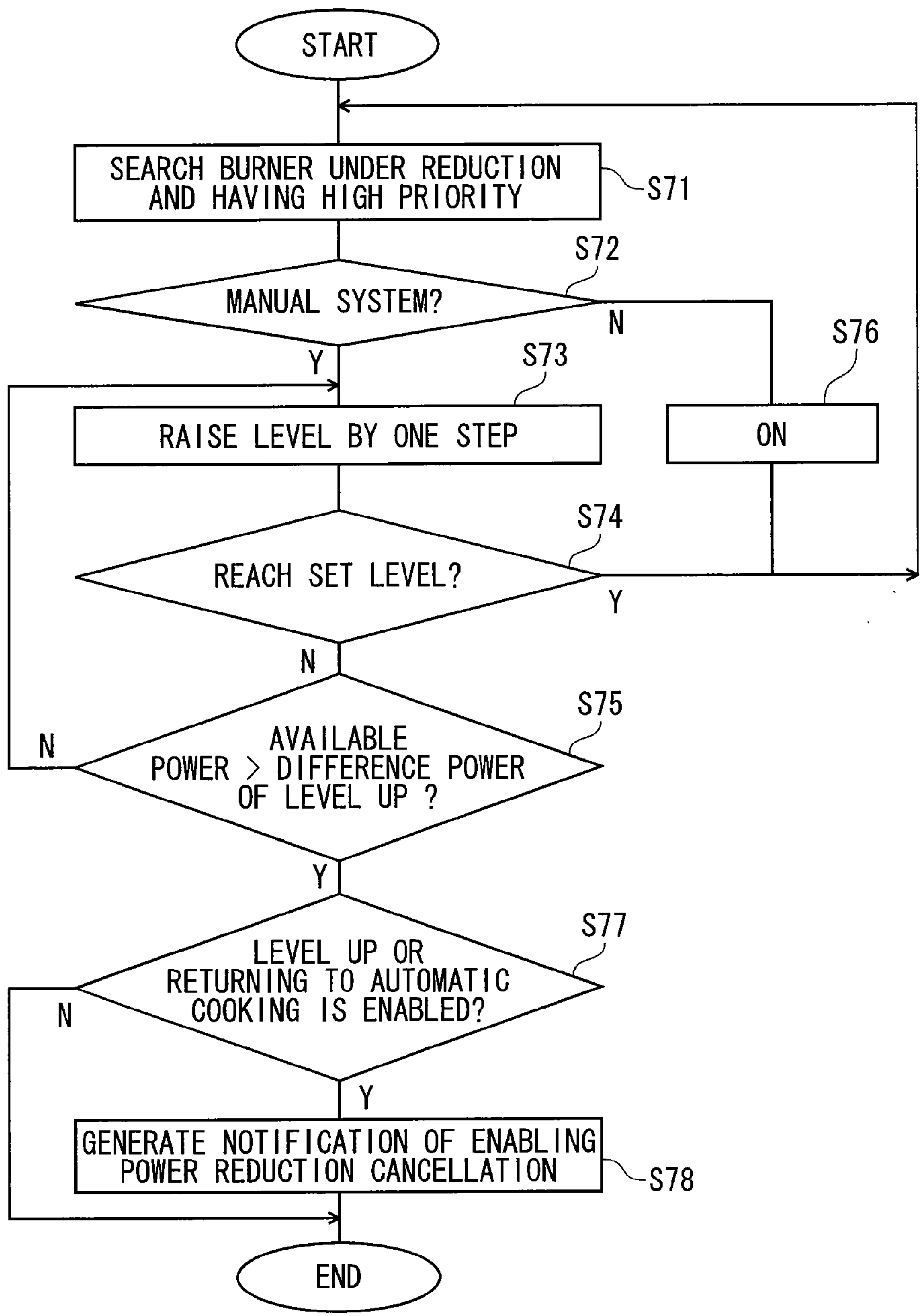
FIG. 7 is a flowchart showing a power suppression cancellation control process of the cooking device.

FIG. 6 is a sequence diagram showing an operation in which, after the power controlling device 3 detects a power which is smaller than a predetermined value, power reduction of a device on which power reduction has been performed is cancelled, and FIG. 7 is a flowchart showing an operation advancing cancellation of power reduction in ascending order of priority B in the cooking device 4.

Referring to FIG. 6, in the power controlling device 3, when the controlling unit 14 determines that the total value of the currents detected by the L1 current detecting unit 11*a* and the L2 current detecting unit 11*b* is reduced to be equal to or smaller than 90% of the current value (in the embodiment, 30 A) set in the current upper limit setting unit 15 (S61), it is determined that there arises a margin of electric power in a house, and the notifying unit 22 cancels the alarm notification by a sound or a display (S62). Then, the transmitting/receiving unit 21 transmits the available power notification signal to devices in descending order of priority which is set in the priority setting unit 16 (S63). Here, it is assumed that two devices or the cooking device 4 and the adaptor 5*a* to which the air conditioner 7*a* is connected exist as controllable devices, and that the priority of the cooking device 4 is set to be higher than that of the adaptor 5*a*. Therefore, the available power notification signal is transmitted to the cooking device 4. Information contained in the available power notification signal is the power value. In the case where the total value of the currents detected by the L1 current detecting unit 11*a* and the L2 current detecting unit 11*b* is 90% of the current value of 30 A which is set in the current upper limit setting unit 15 or 27A, for example, the difference or 3 A is converted to a power value, and 300 W (3 A×100 V) is set as the power value which is notified to be available.

In the cooking device 4, when the transmitting/receiving unit 21 receives the available power notification signal, the controlling unit 34 analyzes the received information, and performs the process of canceling power suppression (S64), with the result that, as information containing the available power value which is determined in the device output power determining unit 39, an available power notification replay signal is transmitted as a reply indicating whether cancellation of the power suppression is enabled or not (S65). The operation of the power suppression canceling process in step S64 will be described in detail later with reference to FIG. 7.

Upon receiving the available power notification signal, the cooking device 4 performs the power suppression canceling process. The power suppression canceling process will be described with reference to the flowchart of FIG. 7.

Referring to FIG. 7, first, the priority which is mostly higher than priority B is searched from the burners 41 which are under power reduction and the heating modes in the table of FIG. 5 (S71).

Then, the controlling unit 34 determines whether the cooking system is the manual system or the automatic cooking system (S72). If the manual system, the device output power determining unit 39 refers the heating cooking priority managing unit 37 through the controlling unit 34, and raises the level of the heating mode in the reduced state by one step (S73). If the level is returned to the level which is set before the power reduction (S74), the process returns to the search for another burner. If the level has not been returned to the level which is set before the power reduction, the controlling unit 34 compares the available power value with the difference of the level up, and searches the maximum level within the available power value and within the set level (S75).

As a specific example, it is assumed that, in the state where the powers of the left IH 41*b* and the rear IH 41*c* are reduced as shown in the state of 2) of FIG. 8, there arises a margin of electric power, and the power controlling device 3 receives the available power value=300 W. In this case, the burners in which the power is currently reduced are the left IH 41*b* and the rear IH 41*c*. When priorities B of the two burners are compared to each other, the priority B of the left IH 41*b* is higher. Therefore, it is checked whether the level of the left IH 41*b* can be preferentially increased or not. In the left IH 41*b*, even when the level of the heating mode is changed from L4 to L5 or returned to the original heating mode, only 200 W is increased, and therefore the returning to the original is enabled. Although the remaining 100 W is still available, the increase of the level of the rear IH 41*c* of the next priority from OFF to L1 requires 300 W, and hence the remaining power is insufficient. In this case, therefore, only the heating power of the left IH 41*b* can be increased.

As described above, the device output power determining unit 39 refers the heating cooking priority managing unit 37 through the controlling unit 34, determines whether the burners 41 are restorable within the available power value in accordance with priority B or not, and determines the set values of the burners 41 within a range which does not exceed the available power value.

If, in even one of the burners 41 in which power is reduced, the level is increased in the case of the manual system, or returning to the automatic cooking is enabled in the case of the automatic cooking system, i.e., a power adjustment amount is increased larger than 0 W (S77), the device output power determining unit 39 notifies the user that the power reduction cancellation is enabled, by a method in which the LED lamp blinks in the displaying unit 36, or the like (S78). Although not illustrated in FIG. 2, it is a matter of course that, when the notification is performed not only by the displaying unit, and also by a buzzer, a sound, or the like, the user can further easily know the state where the power reduction cancellation is enabled.

When the display is performed in a manner that burners 41 in which the power can be increased can be known, the user usability is further improved.

The expression that the level is raised or the automatic cooking is ON in step S73 or step S76 means only that the power value in the table shown in FIG. 5 is referred, and is not reflected in the power output. In a burner 41 in which the power is once reduced, when there arises a margin of the power and the heating power (electric power) is automatically returned, there is a possibility that boil-off due to the state before the power reduction is performed may occur. For the sake of safety, the user is notified that the state where the heating power (electric power) can be increased is attained, with a sound or a display, so that the user knows the state, then the user performs an operation, whereby the level of the heating mode of the burner 41 in which the power is reduced is raised, or the automatic cooking is restored.

In the automatic cooking system, the output power pattern is changed in the sequence, and the maximum power in the sequence is large. As shown in FIG. 5, with respect to priority B, therefore, the priority of the manual system is made higher so that cooking can be performed as far as possible in the case where a plurality of burners 41 are used.

As described above, when heating modes such as shown in FIG. 5, powers corresponding to the heating modes, the priority A of reduction of the power, and the priority B of notification of the power suppression cancellation state after power suppression are previously determined, the user can know the burner 41 and heating mode having a higher priority. In the case where the user simultaneously uses a plurality of burners 41, the burner 41 or heating mode having a higher priority is used in cooking which seems to be important, so that, even when the margin of electric power in a house is small, cooking can be smoothly continued.

In the power reduction or power suppression reduction of the cooking device 4, the power value corresponding to the heating mode shown in the table of FIG. 5 is compared with the available power or reduction power which is sent from the power controlling device 3, and therefore the control is performed by a power difference when the heating mode is changed by one step. In the table of FIG. 5, when the heating mode of the left IH 41*b* has a level=L5, for example, the power is 900 W, and, in the case where reduction of only 100 W is necessary, when the level of the heating mode of the left IH 41*b* set to L4, there is a case where a power more than necessary, or 200 W is reduced. When the operation at 800 W is clearly shown in the displaying unit, only power reduction of the minimum necessary can be performed, and therefore the limited power in a house can be further efficiently used.

The priority A is set in descending order of priority, or, in the manual system, in the order of the left IH 41*b*, the right IH 41*a*, and the rear IH 41*c*. In a configuration where the user can change the setting of priority through the displaying unit 36, the user usability is further improved. When the screen of the television set 10 is used as setting changing means, the user can set the priority in a visual and easily understandable manner.

In the case where the predetermined value at which the power controlling device 3 requests a device to reduce the power is set to a rated value at which the breaker does not trip, even when the current value detected by the power controlling device 3 is equal to or larger than the predetermined value, the breaker can be prevented from tripping by suppressing the power of a device having a lower priority, and devices are operated while the rated current capacity is effectively used. On the side of the power controlling device 3, it is not required to consider the setting state such as the operation mode of the device side, or the consumed power state, it is required only to transmit a necessary reduction power to the device, and, even when the device side does not perform a complicated control process, the device side is requested to perform only power suppression in accordance with the received reduction power request. Therefore, also a complicated information processing function is not necessary, and hence a system can be economically constructed.

In the case where the current is equal to or smaller than the rated current in the power supply system to be measured, the transmission of the available power notification signal is performed in devices which are in the power suppression state, in descending order of priority, whereby the power suppression states of the devices are relaxed or cancelled. Therefore, the devices are operated while the rated current capacity is effectively used.

In the power reduction suppression control process, when a state where even a small amount of power can be increased is attained, notification to the user is performed, and the operation of increasing the power is performed by means of manipulation after the user checks the notification. In the case where the state of a cooking pot on a burner can be accurately known by a temperature sensor, an image sensor, or the like, and there is no danger of boil-off even when the heating power (electric power) is returned, the heating power (electric power) may be automatically returned to the original state.

In the embodiment, the communication network unit transmits and receives data by wireless communication of the specific low power wireless system in which wirings are not required. Alternatively, the power line communication or wired connection may be used.

In the embodiment, the cooking device 4 is used. Any device may be used as far as, in the same device, a plurality of operations can be simultaneously set and operated.

In the embodiment, the description has been made while assuming that, as a value indicating a priority is smaller, the priority is lower. The manner of defining the relationships between a value indicating a priority and the substantial priority is a design matter, and the relationships between a value indicating a priority and the substantial priority can be defined without departing the spirit of the invention.

The embodiment may be similarly configured also as a program for causing a computer to function as all or a part of means of a power control system.

The means and units which have been described in the embodiment may be implemented in the form of a program which causes hardware resources such as electrical/information devices including a CPU (or a microcomputer), a RAM. a ROM, a storage/recording device, an I/O interface, and the like, a computer, and a server to cooperate with one another. When implemented in the form of a program, the program can be recorded on a recording medium such as a magnetic medium or an optical medium, and distributed by using a communication line such as the Internet, whereby distribution and updation of a new function, and a work of installing it can be easily performed.

The application is based on Japanese Patent Application (No. 2009-147427) filed Jun. 22, 2009, and its disclosure is incorporated herein by reference.

INDUSTRIAL APPLICABILITY

As described above, in the cooking device, and method and program for controlling a cooking device according to the invention, a cooking device is used as a household electrical appliance. Even in a device in which a plurality of modes can be set and simultaneously operated, when priorities are similarly given, however, a similar method can be applied.

The invention claimed is:

1. A cooking device comprising:

a first heating cooking unit and a second heating cooking unit configured to heat a cooking object;

a mode setting unit configured to set heating modes of the first heating cooking unit and the second heating cooking unit;

wherein the heating modes of the mode setting unit comprise:

a manual system mode in which a heating temperature level is not changed during heating of the cooking object by the first heating cooking unit or the second heating cooking unit; and an automatic cooking system mode in which the heating temperature level is automatically changed by operation of a temperature sensor during heating of the first heating cooking unit or the second heating cooking unit;

a power calculating unit configured to calculate power consumption amounts of the first heating cooking unit and the second heating cooking unit:

a receiving unit configured to receive, from a remote power controlling device, a power reduction request signal that requests a reduction of power consumption that is lower than the power consumption amounts calculated by the power calculating unit, and to receive a power reduction cancellation signal that requests an increase of the power consumption that is higher than the power consumption amounts calculated by the power calculating unit;

a priority managing unit configured to store reduction priorities for the first heating cooking unit and the second heating cooking unit, in order to designate one of the first heating cooking unit and the second heating cooking unit for a power adjustment after the receiving unit receives the power reduction request signal, and to store cancellation priorities for the first heating cooking unit and the second heating cooking unit, in order to designate one of the first heating cooking unit and the second heating cooking unit for a power adjustment after the receiving unit receives the power reduction cancellation signal; and a power adjustment amount determining unit that, upon the receiving unit receiving the power reduction request signal, is configured to:

determine a power consumption reduction amount for a lower one of the reduction priorities of the first heating cooking unit and the second heating cooking unit, and determine a power consumption adjustment amount for a higher one of the cancellation priorities of the first heating cooking unit and the second heating cooking unit, wherein the first heating cooking unit and the second heating cooking unit are each connected to the mode setting unit, and are configured to adjust the reduction priority and the cancellation priority, the reduction priorities and the cancellation priorities have different values for each heating mode of the mode setting unit, and the reduction priority of the first heating cooking unit or the second heating cooking unit, in the manual system mode, has a value lower than the reduction priority in the automatic cooking system mode.

2. A cooking device comprising:

a first heating cooking unit and a second heating cooking unit configured to heat a cooking object;

a mode setting unit configured to set heating modes of the first heating cooking unit and the second heating cooking unit;

wherein the heating modes of the mode setting unit comprises:

a manual system mode in which a heating temperature level is not changed during heating of the cooking object by the first heating cooking unit or the second heating cooking unit; and an automatic cooking system mode in which the heating temperature level is automatically changed by operation of a temperature sensor during heating of the first heating cooking unit or the second heating cooking unit;

a power calculating unit configured to calculate power consumption amounts of the first heating cooking unit and the second heating cooking unit:

a receiving unit configured to receive, from a remote power controlling device, a power reduction request signal that requests a reduction of power consumption that is lower than the power consumption amounts calculated by the power calculating unit, and to receive a power reduction cancellation signal that requests an increase of the power consumption that is higher than the power consumption amounts calculated by the power calculating unit;

a priority managing unit configured to store reduction priorities for the first heating cooking unit and the second heating cooking unit, in order to designate one of the first heating cooking unit and the second heating cooking unit for a power adjustment after the receiving unit receives the power reduction request signal, and to store cancellation priorities for the first heating cooking unit and the second heating cooking unit, in order to designate one of the first heating cooking unit and the second heating cooking unit for a power adjustment after the receiving unit receives the power reduction cancellation signal; and a power adjustment amount determining unit that, upon the receiving unit receiving the power reduction request signal, is configured to:

determine a power consumption reduction amount for a lower one of the reduction priorities of the first heating cooking unit and the second heating cooking unit, and determine a power consumption adjustment amount for a higher one of the cancellation priorities of the first heating cooking unit and the second heating cooking unit, wherein the first heating cooking unit and the second heating cooking unit are each connected to the mode setting unit, and are configured to adjust the reduction priority and the cancellation priority, the reduction priorities and the cancellation priorities have values different values for each heating mode of the mode setting unit, and the cancellation priority of the first heating cooking unit or the second heating cooking unit in the manual system mode has a value higher than the cancellation priority in the automatic cooking system mode.

3. The cooking device according to claim 1, wherein the power reduction cancellation signal received by the receiving unit comprises information indicative of a power amount to be cancelled, and wherein the cooking device further comprises a notifying unit configured to generate a notification in a case where the power consumption reduction amount determined by the power adjustment amount determining unit when the receiving unit receives the power reduction cancellation signal is larger than 0.

* * * * *